(12) United States Patent
Yang et al.

(10) Patent No.: US 12,551,598 B2
(45) Date of Patent: Feb. 17, 2026

(54) TUBULAR MATERIAL, PREPARATION METHOD THEREFOR AND USE THEREOF

(71) Applicant: CHANGCHUN INSTITUTE OF APPLIED CHEMISTRY, CHINESE ACADEMY OF SCIENCE, Jilin (CN)

(72) Inventors: Xiaoniu Yang, Jilin (CN); Shuo Li, Jilin (CN); Hongying Lv, Jilin (CN); Lei Yang, Jilin (CN); Jiangshan Tu, Jilin (CN); Haiyang Wu, Jilin (CN)

(73) Assignee: CHANGCHUN INSTITUTE OF APPLIED CHEMISTRY, CHINESE ACADEMY OF SCIENCE, Jilin (CN)

(*) Notice: Subject to any disclaimer, the term of this patent is extended or adjusted under 35 U.S.C. 154(b) by 179 days.

(21) Appl. No.: 18/271,446

(22) PCT Filed: Jul. 27, 2022

(86) PCT No.: PCT/CN2022/108211
§ 371 (c)(1),
(2) Date: Jul. 8, 2023

(87) PCT Pub. No.: WO2023/103404
PCT Pub. Date: Jun. 15, 2023

(65) Prior Publication Data
US 2024/0082458 A1    Mar. 14, 2024

(30) Foreign Application Priority Data
Dec. 6, 2021    (CN) .......................... 202111481231.5

(51) Int. Cl.
*B29C 64/00*    (2017.01)
*A61L 27/18*    (2006.01)
(Continued)

(52) U.S. Cl.
CPC .............. *A61L 27/18* (2013.01); *A61L 27/507* (2013.01); *B29C 41/12* (2013.01); *B29C 41/22* (2013.01);
(Continued)

(58) Field of Classification Search
CPC .............................. A61L 27/18; A61L 27/507
See application file for complete search history.

(56) References Cited

U.S. PATENT DOCUMENTS 4,938,763 A    7/1990 Dunn et al.
5,725,491 A    3/1998 Tipton et al.
(Continued)

FOREIGN PATENT DOCUMENTS

CN    108379667 A    8/2018
CN    108864472 A    11/2018
(Continued)

OTHER PUBLICATIONS

International Search Report for PCT/CN2022/108211 mailed Sep. 20, 2022, ISA/CN.

*Primary Examiner* — Nicholas Krasnow
(74) *Attorney, Agent, or Firm* — Yue (Robert) Xu; Apex Attorneys at Law, LLP

(57) ABSTRACT

Provided is a preparation method for a tube. The method comprises the following steps: a) adding a polymer solution into a poor solvent, such that the polymer diffuses on the liquid level of the poor solvent, so as to obtain a polymer film, wherein the solvent in the polymer solution is dissolved in the poor solvent; b) curling the polymer film on the liquid level of the poor solvent by using a mold to obtain a bar; and c) removing the mold to obtain a tube. The present invention further provides the use of the above tubular as an artificial tubular tissue.

13 Claims, 13 Drawing Sheets

(51) Int. Cl.
  *A61L 27/50* (2006.01)
  *B29C 41/12* (2006.01)
  *B29C 41/22* (2006.01)
  *B29K 25/00* (2006.01)
  *B29K 67/00* (2006.01)
  *B29K 75/00* (2006.01)
  *B29L 23/00* (2006.01)
  *B29L 31/00* (2006.01)

(52) U.S. Cl.
  CPC .... *B29K 2025/06* (2013.01); *B29K 2067/003* (2013.01); *B29K 2067/046* (2013.01); *B29K 2075/00* (2013.01); *B29L 2023/001* (2013.01); *B29L 2031/7532* (2013.01)

(56) References Cited

U.S. PATENT DOCUMENTS

| 2005/0087491 A1* | 4/2005 | Hennige | B01D 67/009 |
| | | | 210/508 |
| 2013/0006349 A1* | 1/2013 | Chun | B32B 5/022 |
| | | | 435/395 |

FOREIGN PATENT DOCUMENTS

| CN | 109513049 A | 3/2019 |
| CN | 111004508 A | 4/2020 |
| CN | 114404659 A | 4/2022 |

* cited by examiner (A)                    (B)

TUBULAR MATERIAL, PREPARATION METHOD THEREFOR AND USE THEREOF

This disclosure is a national phase application of PCT international patent application PCT/CN2022/108211, filed on Jul. 27, 2022 which claims the priority to Chinese patent application No. 202111481231.5 titled "TUBULAR MATERIAL, PREPARATION METHOD THEREFOR AND USE THEREOF", filed with the China National Intellectual Property Administration on Dec. 6, 2021, which are incorporated herein by reference in its entirety.

FIELD

The present application relates to the technical field of materials, in particular to a tubular material, a method for preparing the tubular material and an application of the tubular material.

BACKGROUND

In recent years, cardiovascular diseases have seriously endangered human health, and vascular transplantation has attracted an increasing attention. The best choice for the vascular transplantation is to use autologous blood vessels, but the sources thereof are limited and can no longer meet the demand for the vascular transplantation. Therefore, it is particularly important and urgent to prepare small-diameter artificial blood vessels that can replace autologous vessels for transplantation.

The prior art has disclosed various methods for the preparation of artificial blood vessels, including electrostatic spinning method, solution casting method, dip-and-solidify method, and film rolling method. Regarding the electrostatic spinning method, by means of electrostatic atomization to the polymer solution, the polymer is atomized into tiny jets, under the action of electric field, the droplets at the needle is transferred from spherical to conical (i.e. Taylor cone), and is extended at the cone tip so as to form fiber filaments, the fiber filaments is carried with a mold plate, and then the tubular material is got. The method is prone to the problems of nozzle clogging and spinning discontinuity. Regarding the solution casting method, it is applied to obtain tubular material by injecting a solution between the two layers of the hollow cylinder and the inner core and then removing the solvent. However, this method requires the removal of the solvent, the heating method to remove the solvent may destroy the temperature sensitive components contained in the material, and the freezing method to remove the solvent requires a longer time. The dip-and-solidify method involves dipping the mold into the polymer solution, lifting the mold from the solvent and then molding the mold by evaporating the solvent or dipping the mold into the solidifying bath, but a significant phenomenon of top being thin and bottom being thick exits in the tubular material prepared by this method due to gravity. The film rolling method is used to obtain the tubular material by rolling the prepared film from one side and using a bonding agent for bonding at the interface or as a whole. This method is prone to the situation of uneven stress and the collapse of the tubular material.

SUMMARY

In view of this, the present application is aimed to provide a tubular material, a method for preparing the tubular material and an application of the tubular material. The method provided in the present application does not require complex equipment and heating, and can quickly prepare a tubular material with uniform and controllable wall thickness, and the tubular material can be used as an artificial tubular tissue, which has good mechanical properties especially when used as an artificial blood vessel.

A method for preparing a tubular material is provided according to the present application, which includes the following steps:
a) adding a polymer solution to a poor solvent to diffuse the polymer into a film on a liquid surface of the poor solvent to obtain a polymer film, wherein a solvent in the polymer solution is dissolved in the poor solvent;
b) rolling the polymer film on the liquid surface of the poor solvent using a mold to obtain a bar material; and
c) removing the mold to obtain the tubular material.

In one embodiment, before step c), the method further includes: repeating step a) and step b) to obtain a bar material including multilayered polymer films.

In one embodiment, before step c), the method further includes: the multilayered polymer films are the same or different in the bar material including multilayered polymer films.

In one embodiment, the step b) is repeated for n times, during the step b) is being repeated until the n/2th or (n+1)/2th or (n−1)/2$^{th}$ time, a rolling position is moved for a first distance in a first direction relative to a rolling position of previous time, and during the rest repetitions are being performed until the n$^{th}$ time, the rolling position is moved for the first distance in a second direction relative to a rolling position of previous time, the first direction is opposite to the second direction, and the first distance is 1 cm to 5 cm.

In one embodiment, between step a) and step b), the method further includes: performing surface treatment to the polymer film.

In one embodiment, the surface treatment includes: laser etching of the polymer film.

In one embodiment, a surface of the mold has a microstructure.

In one embodiment, the polymer includes one or more of polyurethane, polycaprolactone, polylactic acid, poly(styrene-ethylene-butylene-styrene) or polyethylene terephthalate;
the solvent in the polymer solution includes one or more of N,N-dimethylformamide, tetrahydrofuran, hexafluoroisopropanol, dioxane or dimethyl sulfoxide; and
the poor solvent is water.

In one embodiment, the polymer solution further includes an active substance.

The present application further provides a tubular material obtained by the preparation method according to the above technical solutions, where the tubular material does not contain a binder.

The present application further provides the use of the tubular material obtained by the preparation method according to the above technical solutions in a preparation of artificial tubular tissue.

In one embodiment, the artificial tubular tissue includes an artificial blood vessel, an artificial nerve conduit or an artificial heart stent.

The present application further provides a method for preparing artificial tubular tissue, which includes following steps:
adding a polymer solution to a poor solvent to diffuse the polymer into a film on a liquid surface of the poor solvent to obtain a polymer film, wherein a solvent in the polymer solution is dissolved in the poor solvent;

rolling the polymer film on the liquid surface of the poor solvent using a mold to obtain a bar material;

removing the mold to obtain the tubular material; and modifying the tubular material to obtain the artificial tubular tissue.

In the present application, the polymer is dissolved in good solvent, and then the obtained polymer solution is added to the poor solvent of the polymer, during the drop addition process, the good solvent and the poor solvent exchange solvents at the interface, and the good solvent is dispersed rapidly by the poor solvent to make the polymer diffuse into a film on the surface of the poor solvent, at this time, a small amount of the solvent remains in the side of the polymer film not in contact with the poor solvent to make the obtained polymer film sticky, and then the polymer film is directly rolled by using a mold on the surface of the poor solvent, and the film is tightly bonded by the surface tension of the poor solvent and a shear force of rolling around the axis, and after removing the mold, the tubular material is obtained. During the process, the introduction of the binder is avoided, thus avoiding the situation of uneven stresses and easy collapse of the obtained tubular material, while achieving uniform and controllable wall thickness and uniform and stable mechanical properties. In addition, the method according to the present application does not require complex equipment and heating, and the whole process can be completed at room temperature without thermal effects or thermal deactivation of the active material in the tubular material.

BRIEF DESCRIPTION OF THE DRAWINGS

FIG. 15(A) is an SEM photograph in 100 times magnification;

DETAILED DESCRIPTION

A method for preparing a tubular material is provided according to the present application, which includes the following steps of:

a) a polymer solution is added to a poor solvent to diffuse the polymer into a film on a liquid surface of the poor solvent to obtain a polymer film, and a solvent in the polymer solution is dissolved in the poor solvent;

b) the polymer film is rolled on a liquid surface of the poor solvent with a mold so as to obtain a bar material; and c) the mold is removed to obtain the tubular material.

Figure 1:
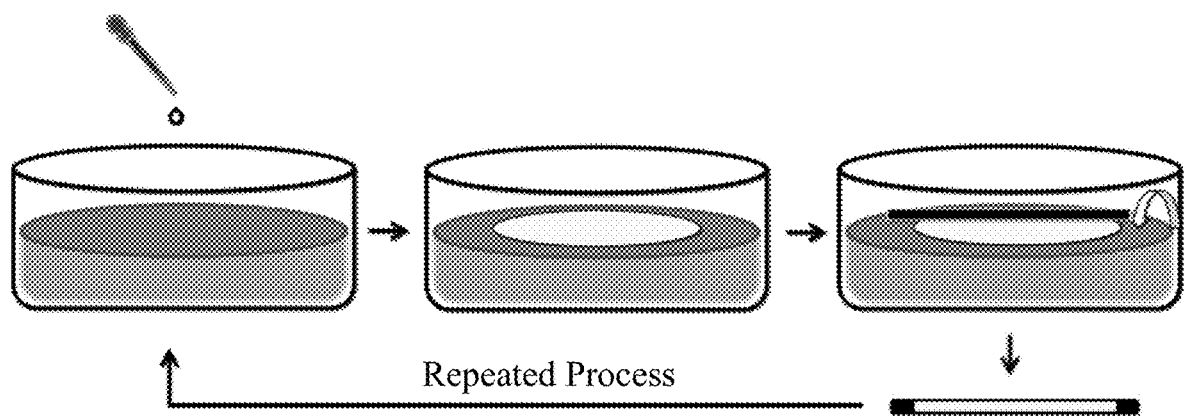
FIG. 1 is a schematic flow chart of a method for preparing the tubular material according to the present application.

Referring to FIG. 1, which is a schematic flow chart of a method for preparing the tubular material according to the present application, the polymer is dissolved in a good solvent and then added in a poor solvent in the first step, and the polymer is diffused into a film on the liquid surface of the poor solvent, then the polymer film is rolled with a mold and the tubular material is obtained after removing the mold, or the above steps are repeated to obtain the tubular material with multilayered polymer films.

In the present application, the polymer is first dissolved in the good solvent to obtain a polymer solution. In one embodiment, the polymer is a polymer capable of forming a film, preferably a polymer with good biocompatibility, including but not limited to polyurethane (PU), polycaprolactone (PCL), polylactic acid (PLA), poly (styrene-ethylene-butylene-styrene) (SEBS), polyethylene terephthalate (PET), etc., and may be one or more of these. In one embodiment, the good solvent includes, but is not limited to, N,N-dimethylformamide, tetrahydrofuran, hexafluoroisopropanol, dioxane, dimethyl sulfoxide, etc., and may be one or more of these. In one embodiment, the polymer solution has a concentration of 10 mg/ml to 200 mg/ml, preferably 30 mg/ml to 180 mg/ml, more preferably 50 mg/ml to 150 mg/ml. In one embodiment, the polymer solution further includes active substances, such as anti-inflammatory active factors, anti-inflammatory agents, growth factors or other physiologically active drugs, proteins, etc., and there are no special limitations to the present application. The polymer solution is added to the poor solvent to diffuse the polymer into a film on the liquid surface of the poor solvent to obtain a polymer film. It will be understood that the present application uses the principle of diffusion film formation, during adding the polymer solution to the poor solvent, the amount and rate of addition of the polymer solution needs to be controlled so that diffusion film formation on the liquid surface can be achieved. In one embodiment, the polymer may form a film on the liquid surface of the poor solvent by adding dropwise or by spraying. In the present application, the good solvent is dissolved in the poor solvent, so that when the polymer solution is added dropwise or sprayed, solvent exchange can be performed at the interface, thereby forming a film. In one embodiment, the poor solvent is water. In one embodiment, the polymer solution is added dropwise to the poor solvent using an autosampler with a flat-angle needle. In one embodiment, the distance of the autosampler from the liquid surface of the poor solvent is 1 cm to 15 cm, preferably 3 cm to 10 cm. In one embodiment, the rate of the drop addition is 1 ml/min to 15 ml/min, preferably 5 ml/min to 10 ml/min. In one embodiment, the amount of the drop addition is preferably 1 drop to 10 drops, more preferably 1 drop to 5 drops.

In other embodiments, the person skilled in the art can select the type and the molecular weight of the polymer according to the actual situation, and also determine the parameters such as the concentration of the polymer solution, the rate of the drop addition and the height from the liquid surface of the poor solvent according to the principle of diffusion film formation, and there is no special limitation to the present application.

In other embodiments, depending on the type and the molecular weight of the polymer, the person skilled in the art can determine the good solvent and the poor solvent as long as the case that the good solvent is dissolved in the poor solvent is satisfied.

Figure 2:
FIG. 2 is a schematic diagram of the helix surface structure of a mold used in an embodiment of the present application.
Figure 3:
FIG. 3 is a schematic diagram of the cinquefoil-shaped cross-sectional structure of the mold used in an embodiment of the present application.
Figure 4:
FIG. 4 is a schematic diagram of the axial array surface structure of the mold used in an embodiment of the present application.

Once the polymer film is obtained, it is not necessary to process the polymer film, and a mold is used to directly roll the polymer film so that the polymer film is wrapped around the outer surface of the mold to form the bar material. In one embodiment, the polymer film is rolled within 8 min after film formation, preferably within 5 min. In one embodiment, the mold is a bar material. In an embodiment, after the polymer is diffused to form a film on the liquid surface of the poor solvent, the bar material is positioned on one side of the polymer film, with the bar material being as an axis and the bar material being tangential to the liquid surface of the poor solvent, and then the film is rolled on the liquid surface of the poor solvent and wrapped around the surface of the bar material. In one embodiment, the bar material has a surface structure or surface microstructure so that the inner surface of the obtained tubular material has a structure or microstructure, for example, the surface of the bar material has a helix structure, as shown in FIG. 2, which is a schematic diagram of the helix surface structure of the mold used in an embodiment of the present application, and the inner surface of the obtained tubular material has a helix structure; or the bar material has an irregular shaped structure in cross-section, as shown in FIG. 3, which is a schematic diagram of the cinquefoil-shaped cross-sectional structure of the mold used in the embodiment of the present application, and the cross-section of the obtained tubular material is cinquefoil-shaped; or the surface of the bar material is an axial array structure, as shown in FIG. 4, which is a schematic diagram of the axial array surface structure of the mold used in the embodiment of the present application, the inner surface of the obtained tubular material is an axial array structure. In the same embodiment, the diameter of the bar material is related to the diameter of the desired tubular material, for example, may be 5 mm or 3 mm, there is no special limitation to the present application.

In the present application, the step a) and step b) may be repeated, i.e., after the polymer solution has diffused into a film on the liquid surface of a poor solvent, the rolling is continued with a mold that has wrapped the polymer film thereon, forming a multilayered polymer film on the mold to obtain a bar material with a multilayered structure, and after removing the mold, a tubular material with a multilayered structure is obtained. The present application has no special limitations on the number of the repetitions, which can be adjusted according to the thickness of the desired tubular material and the concentration of the polymer solution.

In the process of forming the multilayered polymer film, the polymer used in each layer of the polymer film may be the same or different and may be selected according to the situation in which the tubular material is to be used, and there are no special limitations to the present application.

In the process of forming the multilayered polymer film, in order to obtain a tubular material with uniform wall thickness, preferably, the tubular material is rolled according to the following method:

The step b) is repeated for n times, during the step b) is being repeated until the n/2th or $(n+1)/2^{th}$ or $(n-1)/2^{th}$ time, a rolling position is moved for a first distance in a first direction relative to a rolling position of previous time, and during the rest repetitions are performed until the $n^{th}$ time, the rolling position is moved for the first distance in a second direction relative to a rolling position of previous time, the first direction is opposite to the second direction, and the first distance is 1 cm to 5 cm.

Specifically, the rolling may be performed as follows.

The rolling position of second time is moved for a first distance rightward relative to the edge of the tubular material of first time, the rolling position of third time is moved for a first distance rightward relative to the edge of tubular material of second time, the roll position of fourth time is moved for a first distance leftward relative to the roll edge of third time, i.e. to be the same as the rolling position the second time, the rolling position of fifth time is moved for a first distance leftward relative to the rolling edge of fourth time, the rolling position of sixth time is moved for a first distance rightward relative to the rolling edge of the fifth time, i.e. to be the same as the rolling position of second time, the rolling position of seventh time is moved for a first distance rightward relative to the rolling edge of sixth time, and the rolling position of eighth time is moved for a first distance leftward relative to the rolling edge of seventh time, i.e., to be the same as the rolling position of second time, which is repeated according to this rule.

Alternatively, the rolling may be performed as follows.

Each rolling is moved for a first distance rightward relative to the edge of the previous tubular material, and is moved back to the rolling position of the first time at the $n/2^{th}$ time rolling and then continues to move a first distance rightward relative to the edge of the previous tubular material.

Alternatively, the rolling may be performed as follows.

Each rolling is moved for a first distance rightward relative to the edge of the previous tubular material, and is moved for a first distance leftward at the $n/2^{th}$ time rolling and continues to move a first distance leftward relative to the edge of the previous tubular material.

In one embodiment, it is also possible to perform surface treatment to the polymer film obtained by diffusion on liquid surface of the poor solvent, for example performing laser etching to the polymer film so as to obtain the desired surface microstructure. The present application has no special limitations on the surface treatment, and it is possible to perform surface treat only to the first layer of the polymer film, or to all layers of the polymer film, or to one or some of the layers of the polymer film.

After obtaining the bar material, the bar material may be post-treated to remove residual solvents to further bond the multilayered polymer films firmly, and the tubular material can be obtained after removal of the bar material. In one embodiment, the post-treatment may be a resting treatment, for example resting for 20 min to 60 min at room temperature; in one embodiment, the post-treatment may be liquid nitrogen freezing; in one embodiment, the post-treatment may be applying circumferential force to the bar material; and in one embodiment, the post-treatment may be vacuum drying.

After obtaining the bar material, it is also possible not to post-treat the bar material. After direct removal of the mold, the obtained tubular material is immersed in a solution to be used as artificial tubular tissue, for example, immersed in any one of deionized water, TBST solution (Tris-Hcl buffer), PBS solution (phosphate buffer), or physiological saline to be used.

The tubular material prepared according to the method of the present application uses the residual solvent during the film formation process to achieve self-bonding of the film without introducing a binder for bonding, which avoids the situations of uneven stresses and easy collapse of the obtained tubular material, while achieves uniform and controllable wall thickness and uniform and stable mechanical properties. In addition, the method according to the present application does not require complex equipment and heating, and the whole process can be completed at room temperature without thermal effects or thermal deactivation to the active material in the tubular material.

The tubular material according to the present application can be used as artificial tubular tissues, such as artificial blood vessels, artificial nerve conduits and artificial heart stents, with good biocompatibility and mechanical properties.

The present application also provides a method for preparing artificial tubular tissues. The artificial tubular tissues are obtained by further modification of the tubular materials after the tubular materials are prepared according to the method described above. For example, the artificial blood vessel can be obtained by trimming and surface modification of the prepared tubular material; the artificial nerve conduit can be obtained by modification of the prepared tubular material such as perforation, filling or drug loading; and the artificial heart stent can be obtained by perforation and surface modification of the prepared tubular material, etc.

The present application will be further illustrated by embodiments, however, it should be understood that these embodiments do not limit the present application. Any variations of the present application now known or further developed are considered to fall within the scope of the present application as described herein and as protected by the following claims.

In each of the following embodiments, the mechanical properties are tested according to the following parameters.
1. All tensile stress-strain curves are tested at 5 mm/min until the material fractures.
2. For tensile cycle, after pulling to 30% (50%) strain at a speed of 5 mm/min, recover to 0% at a speed of 2.5 mm/min and repeat 30 times.
3. For compression cycle, after compressing to 50% strain at a speed of 5 mm/min, recover to 0% at a speed of 2.5 mm/min, which repeats 30 times.
4. All tensile and compressive mechanical tests are radial tests.

Example 1

Figure 5:
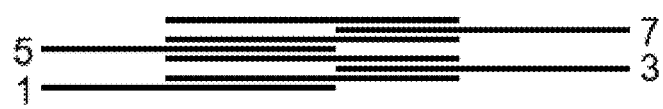
FIG. 5 is a schematic diagram of the rolling method of rolling into a film according to the first example of the present application.

The polyurethane with a molecular weight of 80000 is purchased from Shandong Urso Chemical Technology Co., Ltd. and configured into a solution using N,N-dimethylformamide at a concentration of 50 mg/ml. After complete dissolution, 5 drops are added to the water surface at a rate of 10 ml/min through an autosampler (with a flat-angle needle with an inner diameter of 1.0 mm) at a distance of 5 cm from the water surface, then the solution will be spread on the water surface to form a film, followed by which a 5 mm-diameter PTFE (Polytetrafluoroethylene) bar is used to roll the film from the side of the film around the axis of rolling within 2 min, this process can be repeated. Referring to FIG. 5, which is a schematic diagram of the rolling method of rolling into a film according to the first example of the present application, each rolling position is moved for 3 cm rightward relative to the edge of the last tubular material, the rolling position of the fourth time is moved for 3 cm leftward relative to the rolling edge of the third time, i.e., to be the same as the rolling position of the second time, and according to this rule, the sixth, eighth, tenth time . . . are the same as the position of the second time and are taken measuring until the wall thickness meets the requirement, such as 100 μm, 200 μm, 300 μm, 400 μm, 500 μm and 600 μm, and the mold is withdrawn after 0.5 hours at room temperature, and the tubular material with uniform wall thickness is obtained by trimming.

Figure 6:
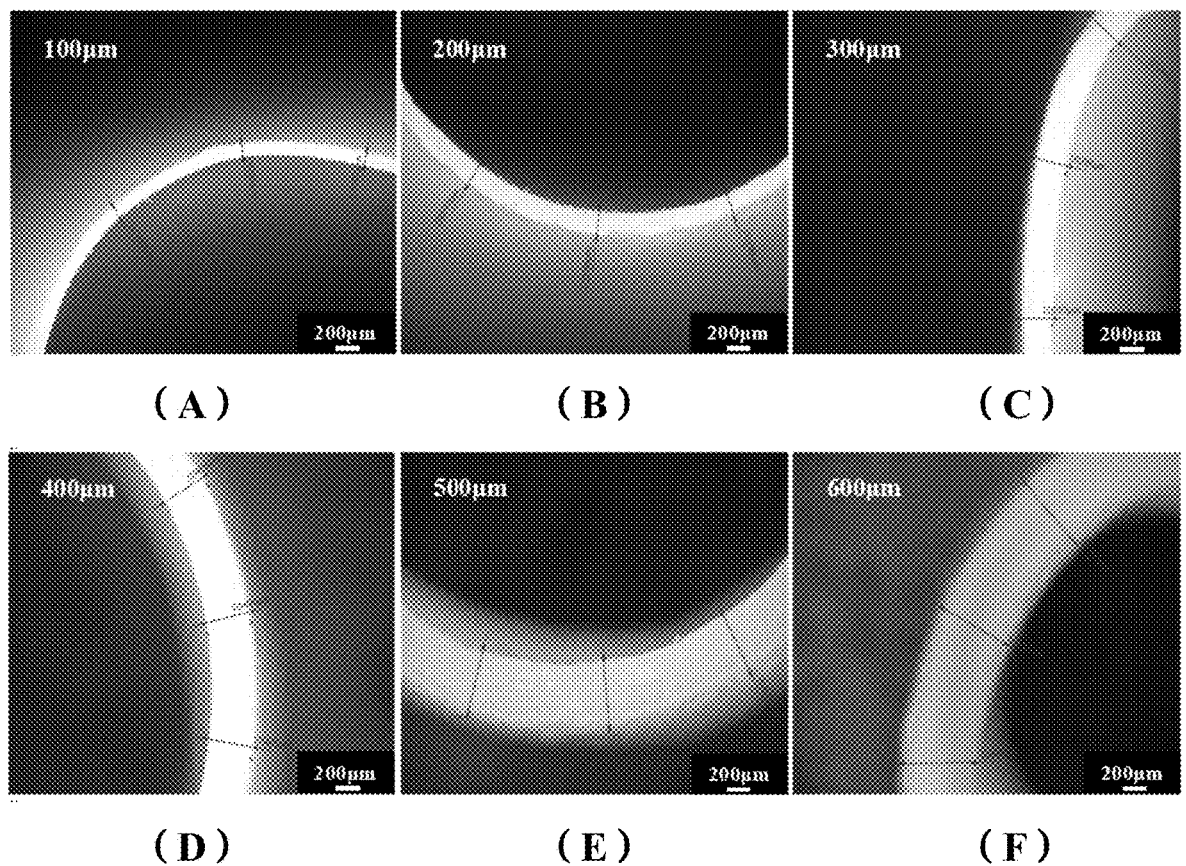
FIG. 6 is an optically magnified photograph of the tubular materials of different wall thicknesses prepared according to the first example of the present application.

The wall cross-sections of the tubular material are characterized and the results are shown in FIG. 6. FIG. 6 shows an optically magnified photograph of the tubular materials of different wall thicknesses prepared according to the first example of the present application. FIG. 6(A) shows an optically magnified photograph of the tubular material with a wall thickness of 100 μm, FIG. 6(B) shows an optically magnified photograph of the tubular material with a wall thickness of 200 μm, FIG. 6(C) shows an optically magnified photograph of the tubular material with a wall thickness of 300 μm, FIG. 6(D) shows an optically magnified photograph of the tubular material with a wall thickness of 400

μm, FIG. 6(E) shows an optically magnified photograph of the tubular material with a wall thickness of 500 μm, FIG. 6(F) shows an optically magnified photograph of the tubular material with a wall thickness of 600 μm wall thickness. As shown in FIG. 6, the wall thickness of the tubular material prepared by the method provided in the present application is more uniform.

Figure 7:
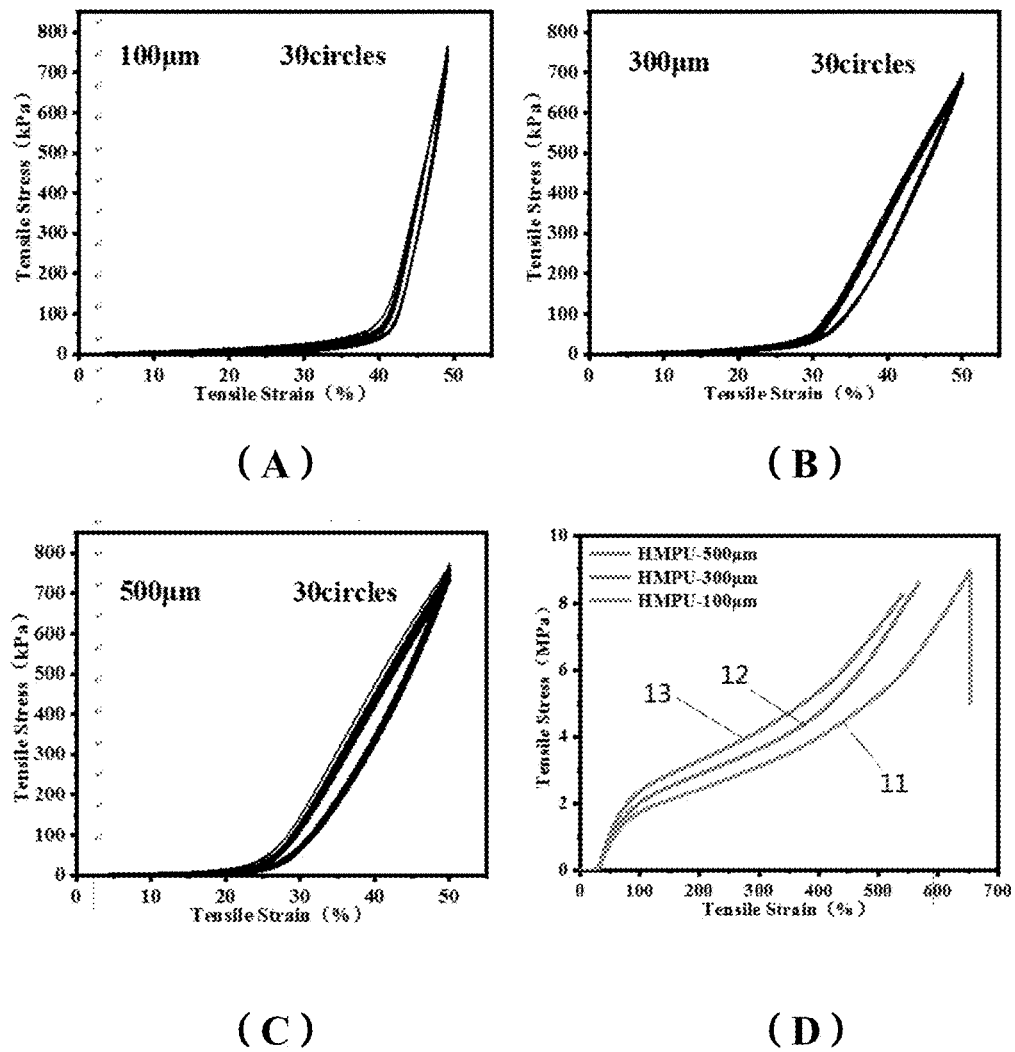
FIG. 7 is a tensile property curve of the tubular material prepared according to the first example of the present application.

The above-mentioned tubular materials with wall thicknesses of 100 μm, 300 μm and 500 μm are subjected to tensile cycling and tensile fracture tests with 30% strain for 30 times, and the results are shown in FIG. 7. FIG. 7 is a tensile property curve of the tubular material prepared according to the first example of the present application. FIG. 7 (A) shows the tensile curve of the tubular material with a wall thickness of 100 μm, FIG. 7 (B) shows the tensile curve of the tubular material with a wall thickness of 300 μm, FIG. 7 (C) shows the tensile curve of the tubular material with a wall thickness of 500 μm, and FIG. 7 (D) shows the tensile curves of the tubular material with a wall thickness of 100 μm, 300 μm and 500 μm, and curves 11, 12 and 13 are the tensile curves of the tubular material with 100 μm, 300 μm and 500 μm respectively. As shown in FIG. 7, it can be seen that the tubular material prepared by the method provided in the present application had good tensile properties.

Example 2

Figure 8:
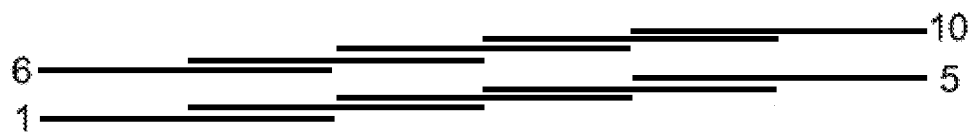
FIG. 8 is a schematic diagram of the rolling method of rolling into a film according to the second example of the present application.

The polyurethane with a molecular weight of 30000 is synthesized in the laboratory, and configured into a solution using dimethyl sulfoxide with a concentration of 150 mg/ml. After complete dissolution, one drop is added to the water surface through the autosampler (the same for the embodiments) at a distance of 3 cm from the water surface, then the solution will be spread on the water surface to form a film, followed by which a 5 mm-diameter glass bar is used to roll the film from one side within 5 min, and each rolling is moved for 5 cm rightward relative to the edge of the last tubular material. As shown in FIG. 8, which is a schematic diagram of the rolling method of rolling into a film according to the second example of the present application, it returns to the first rolling position at the rolling of sixth time, and according to this law, as the wall thickness reaches the requirements by measuring, the mold is withdrawn after the liquid nitrogen freezing, and the tubular material is obtained by trimming.

Figure 9:
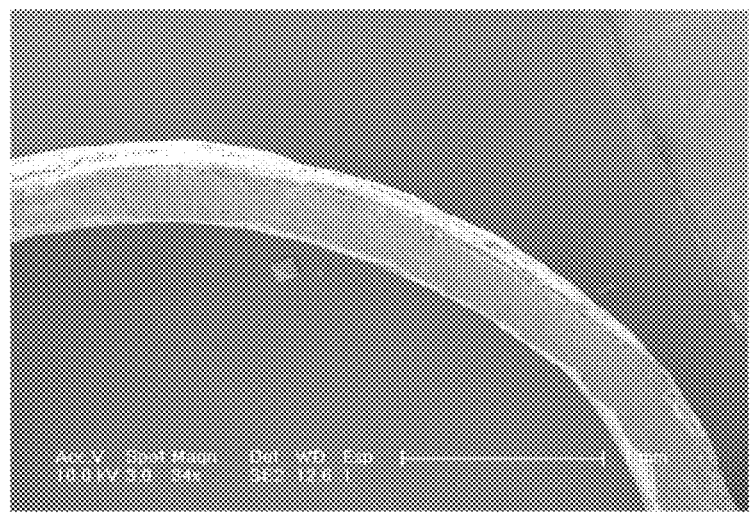
FIG. 9 is an SEM photograph of the tubular material prepared according to the second example of the present application.

The cross-section of the wall of the tubular material is characterized by SEM and the results are shown in FIG. 9. FIG. 9 is an SEM photograph of the tubular material prepared according to the second example of the present application. As shown in FIG. 9, the wall thickness of the tubular material prepared by the method provided in the present application is more uniform.

Figure 10:
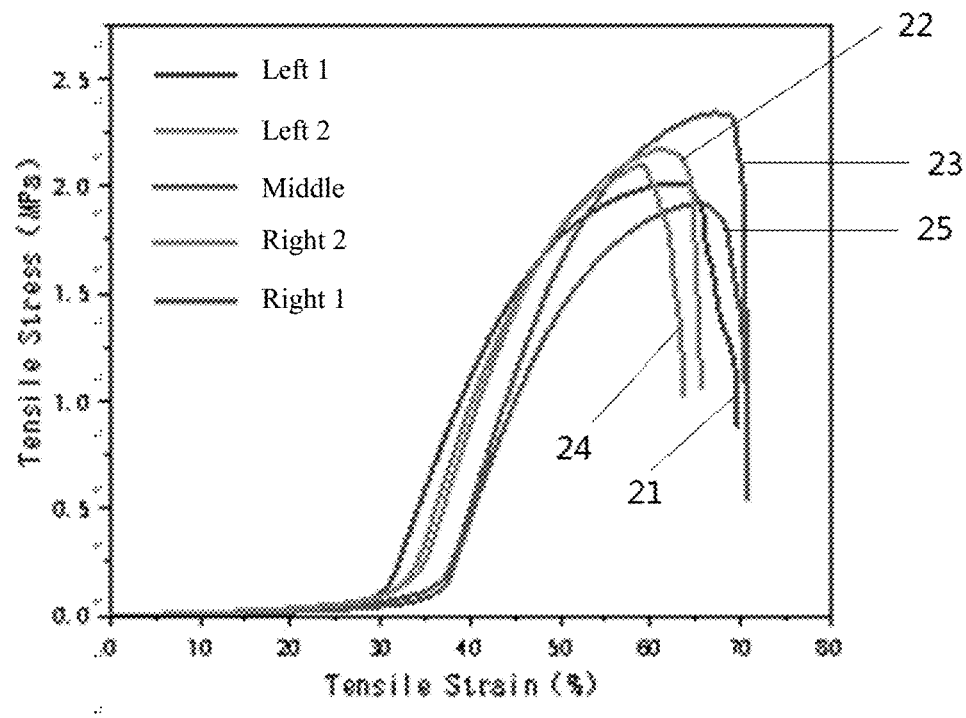
FIG. 10 is a stress-strain curve of the tubular material prepared according to the second example of the present application.

The tubular material is intercepted in 5 sections along the axial direction, which are marked as Left I, Left II, Middle, Right II and Right I, respectively, and the mechanical properties of the tubular material are tested, and the results are shown in FIG. 10. FIG. 10 is a stress-strain curve of the tubular material prepared according to the second example of the present application, where the curves 21, 22, 23, 24 and 25 are the stress-strain curves of the Left I, Left II, Middle, Right II and Right I sections, respectively. As shown in FIG. 10, the tubular material prepared by the preparation method provided by the present application had good tensile properties and the mechanical properties of the tubular material are more homogeneous.

Example 3

In accordance with the method disclosed in the first example, the polyurethane in the first and second examples is used to construct a dual-layers structure, i.e., the polyurethane in the second example is first used to roll the tubular material to form an inner structure, then the polyurethane in the first example is used to form a film on the water surface, and the tubular material formed by the polyurethane in the second example is used to roll the polyurethane in the first example to form an outer layer to obtain a tubular material with dual-layers structure.

Figure 11:
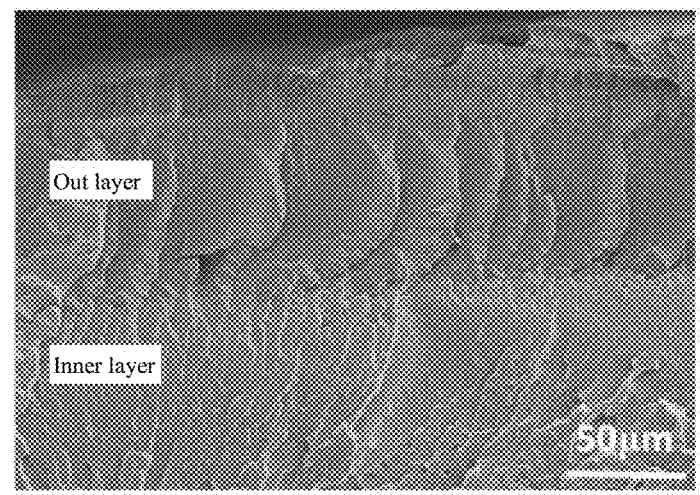
FIG. 11 is an SEM photograph of the tubular material prepared according to the third example of the present application.

The cross-section of the wall of the tubular material is characterized by SEM and the results are shown in FIG. 11. FIG. 11 is an SEM photograph of the tubular material prepared according to the third example of the present application. As shown FIG. 11, the wall thickness of the tubular material prepared by the method provided in the present application is more uniform.

Figure 12:
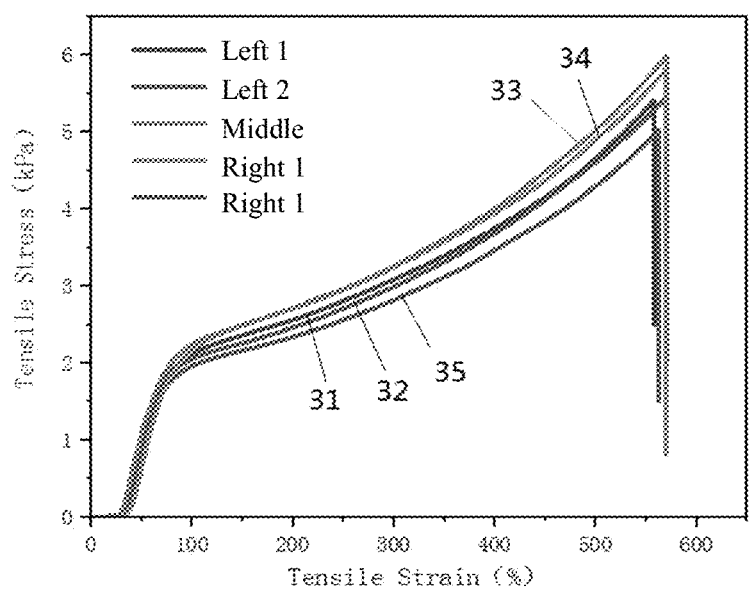
FIG. 12 is a stress-strain curve of the tubular material prepared according to the third example of the present application.

The tubular material is intercepted in 5 sections along the axial direction, which are marked as Left I, Left II, Middle, Right II and Right I, respectively, and the mechanical properties of the tubular material are tested, and the results are shown in FIG. 12. FIG. 12 is a stress-strain curve of the tubular material prepared according to the third example of the present application, where the curves 21, 22, 23, 24 and 25 are the stress-strain curves of the Left I, Left II, Middle, Right II and Right I sections, respectively. As shown in FIG. 12, the tubular material prepared by the preparation method provided by the present application had good tensile properties and the mechanical properties of the tubular material are more homogeneous.

Example 4

SEBS with a molecular weight of 90000 is purchased from Corten, and configured into a solution using tetrahydrofuran at a concentration of 75 mg/ml. After complete dissolution, 10 drops are added to the water surface at a rate of 5 ml/min at a distance of 10 cm from the water surface, and the film is formed on the water surface and then rolled from one side of the film by a 3 mm-diameter PTFE bar within 10 s. After rolling, circumferential force is applied to the film to promote interlayer bonding, and then the PTFE bar is extracted and the rolled film is trimmed to obtain the tubular material.

Example 5

Figure 13:
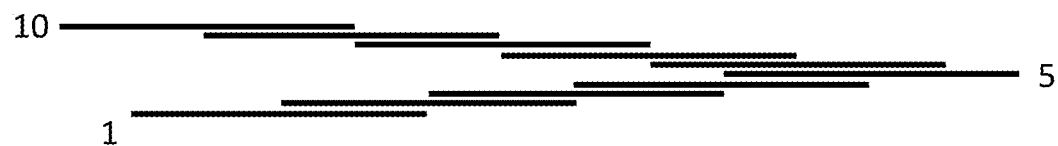
FIG. 13 is a schematic diagram of the rolling method of rolling into a film according to the fifth example of the present application.

The polyurethane in the first and second examples is configured into a solution using dioxane with a concentration of 100 mg/ml at a ratio of 2:1 in mass, and 3 drops are added at a rate of 10 ml/min at a distance of 5 cm from the water surface, the film is formed and then rolled using PTFE bar with a diameter of 5 mm, and it is moved for 3 cm rightward relative to the edge of the last tubular material during each rolling, as shown in FIG. 13, which shows a schematic diagram of the rolling method of rolling into a film according to the fifth example of the present application. The rolling of sixth time is moved for 1.5 cm leftward relative to the edge of the rolling of the fifth time and continued to roll for four times with a moving of 3 cm leftward relative to the edge of the last rolling, followed by which the rolling position is the same as the first rolling, and the operation is repeated according to this rule until the wall thickness of the tubular material is 0.5 mm and the effective length is greater than 5 cm, and the tubular material is frozen by liquid nitrogen and then trimmed and immersed in PBS solution for backup, which can be used as artificial blood vessels.

Figure 14:
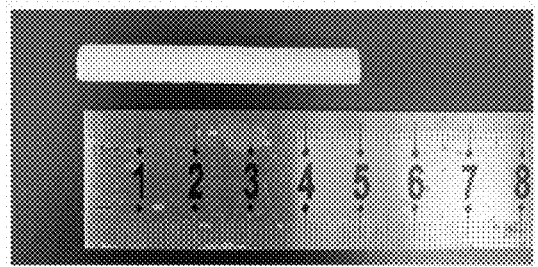
FIG. 14 is a photograph of the tubular material used in the fifth example of the present application.
Figure 15:
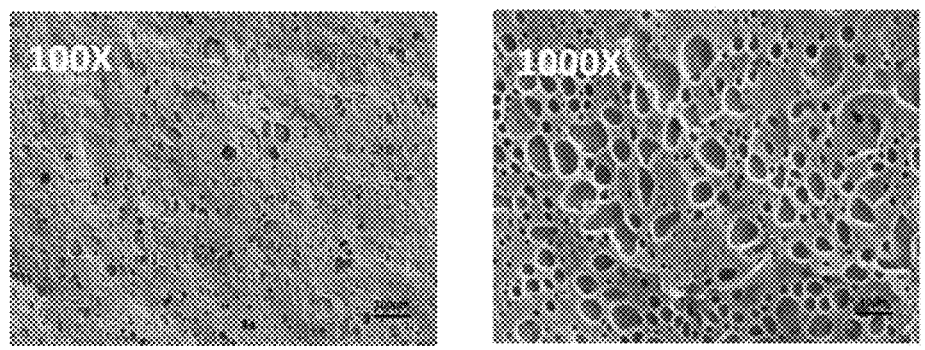
FIG. 15 is an SEM photograph of the inner surface of the tubular material prepared according to the fifth example of the present application.

The sample section of 5 cm of the tubular material is taken as shown in FIG. 14, which is a photograph of the tubular material used in the fifth example according to the present application. The inner surface of the sample section is characterized by SEM and the results are shown in FIG. 15, which is an SEM photograph of the inner surface of the tubular material prepared according to the fifth example of the present application, where FIG. 15(A) is an SEM photograph at 100 times magnification, and FIG. 15 (B) is an SEM photograph at 1000 times magnification, it can be seen from FIG. 15 that the tubular material prepared by the method provided in the present application had a porous inner surface.

Figure 16:
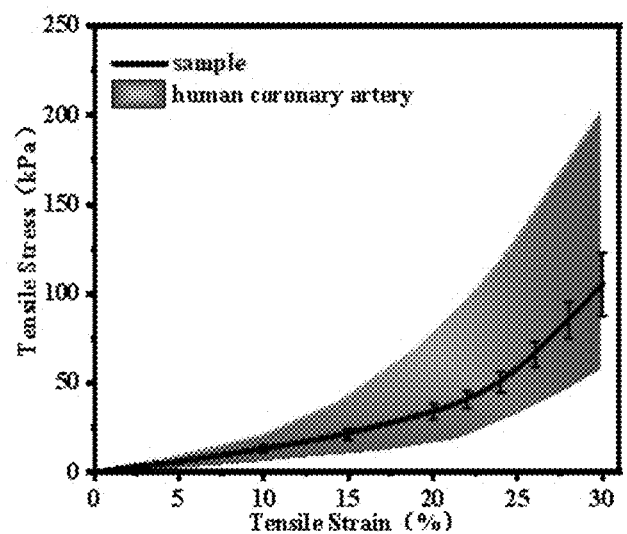
FIG. 16 is a stress-strain curve of the tubular material prepared according to the fifth example of the present application and range of mechanical properties of the human coronary artery.
Figure 17:
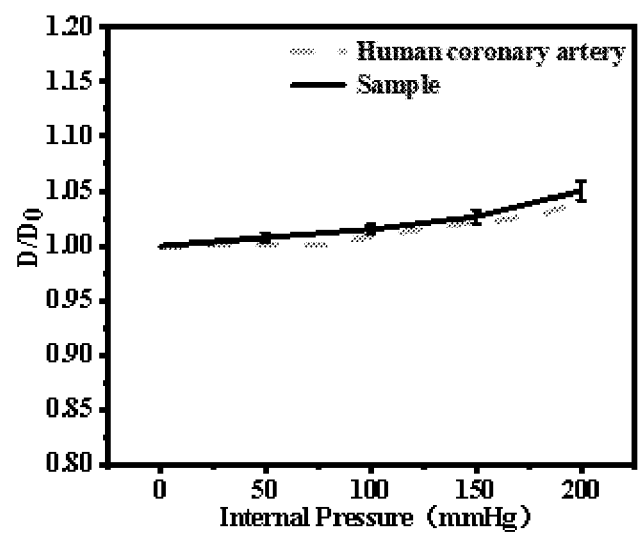
FIG. 17 shows the compliance of the tubular material prepared according to the fifth example of the present application and the human coronary artery.
Figure 18:
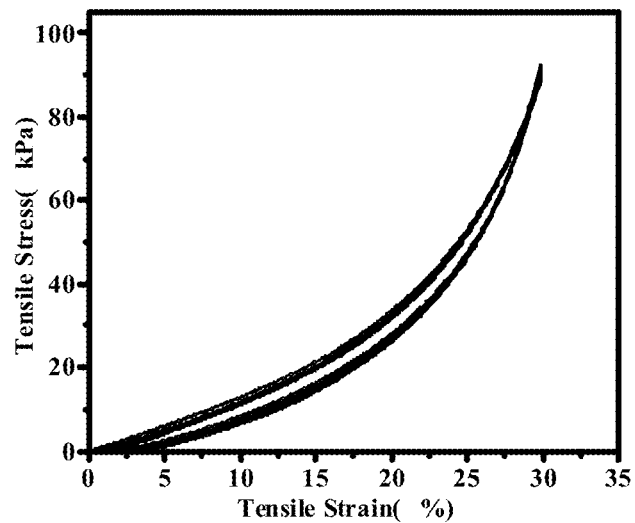
FIG. 18 shows the results of radial tensile cycling test of the tubular material prepared according to the fifth example of the present application.
Figure 19:
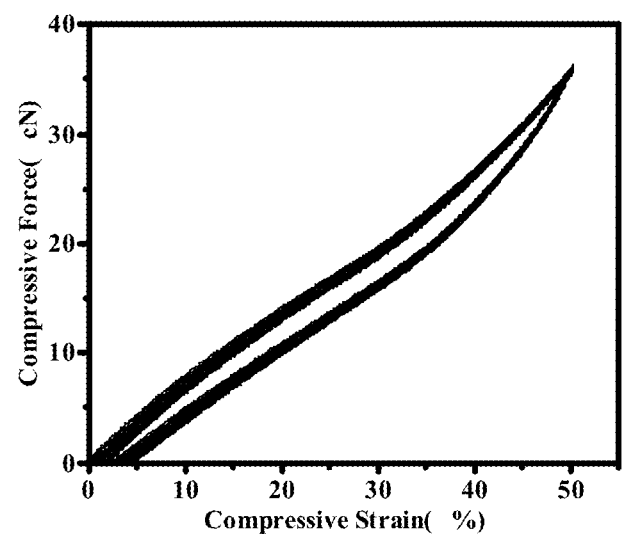
FIG. 19 shows the results of radial compression cycling test of the tubular material prepared according to the fifth example of the present application.
Figure 20:
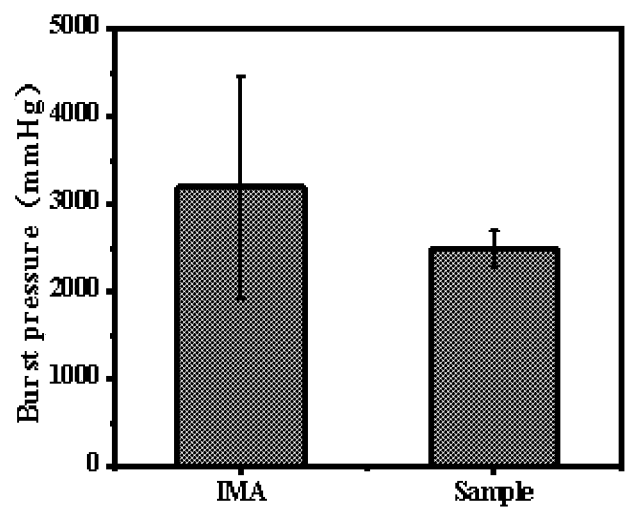
FIG. 20 shows a comparison of the burst pressure of the tubular material prepared according to the fifth example of the present application and an internal mammary artery (IMA)
Figure 21:
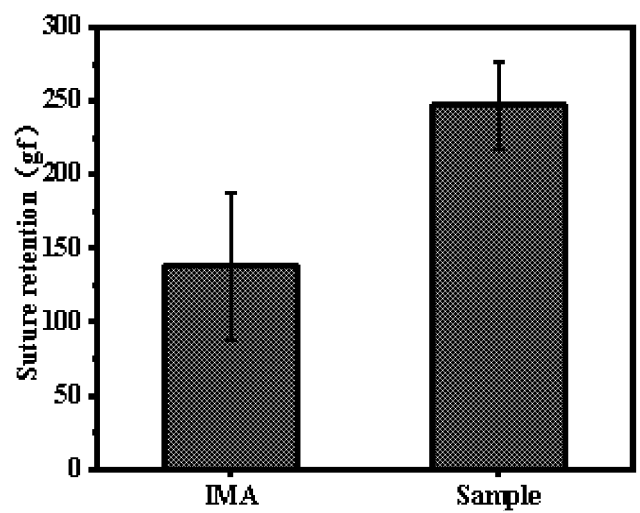
FIG. 21 shows a comparison of the suture strength of the tubular material prepared according to the fifth example of the present application and the internal mammary artery (IMA)

Performance tests of the tubular material, including tensile cycling, compression cycling, compliance, bursting pressure, and suture strength, are performed and the results are shown in FIGS. 16, 17, 18, 19, 20, and 21. FIG. 16 is a stress-strain curve of the tubular material prepared according to the fifth example of the present application and range of mechanical properties of the human coronary artery. FIG. 17 shows the compliance of the tubular material prepared according to the fifth example of the present application and the human coronary artery, where the compliance is expressed by the ratio of the diameter D to the original diameter DO at different pressures. FIG. 18 shows the results of radial tensile cycling test of the tubular material prepared according to the fifth example of the present application. FIG. 19 shows the results of radial compression cycling test of the tubular material prepared according to the fifth example of the present application. FIG. 20 shows a comparison of the burst pressure of the tubular material prepared according to the fifth example of the present application and the internal thoracic artery (IMA). FIG. 21 shows a comparison of the suture strength of the tubular material prepared according to the fifth example of the present application and the internal thoracic artery (IMIA). As can be seen from FIGS. 16, 17, 18, 19, 20 and 21, the mechanical properties of the tubular material prepared by the method according to the present application are stable and similar to those of human coronary arteries, and can be used as artificial blood vessels, while the tubular material prepared by the method according to the present application has a similar burst pressure to that of intrathoracic arteries and a higher suture strength.

Figure 22:
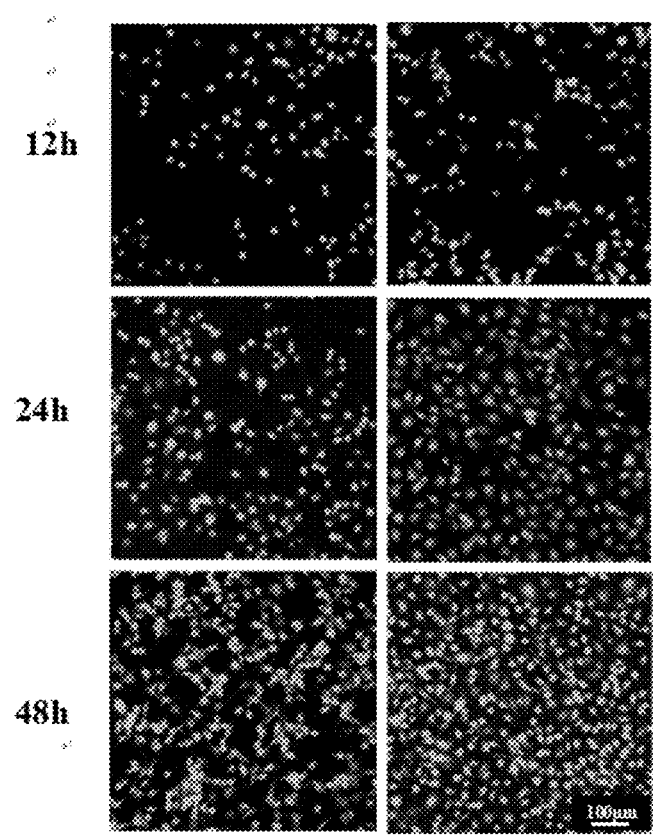
FIG. 22 is a fluorescent image of cells cultured in the tubular material prepared according to the fifth example of the present application.
Figure 23:
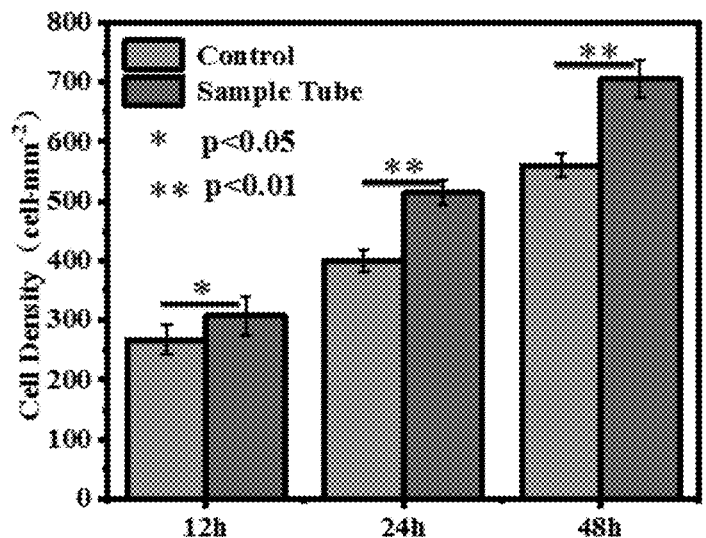
FIG. 23 is a time-density curve of cells cultured in the tubular material prepared according to the fifth example of the present application.
Figure 24:
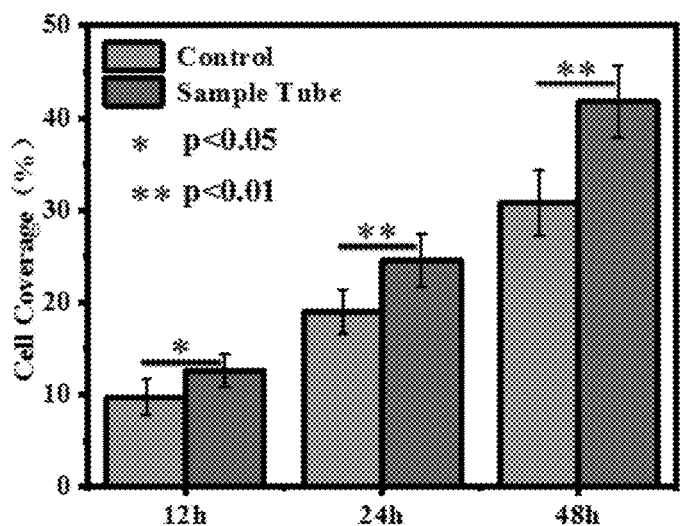
FIG. 24 is a time-cell coverage curve of cells cultured in the tubular material prepared according to the fifth example of the present application.

HUVECs (Human Umbilical Vein Endothelial Cells) are cultured on the above tubular material, cells are inoculated in 96-well plates at a density of 5000 cells/well and cultured for 12 h, 24 h, and 48 h, which are shown in FIGS. 22, 23 and 24. FIG. 22 is a fluorescent image of cells cultured in the tubular material prepared according to the fifth example of the present application; the left column of the image shows the control group, i.e. HUVECs cultured on glass sheets, and the right column shows the experimental group, i.e. fHUVECs cultured on the inner surface of the tubular material. FIG. 23 is a time-density curve of cells cultured in the tubular material prepared according to the fifth example of the present application. FIG. 24 is a time-cell coverage curve of cells cultured in the tubular material prepared according to the fifth example of the present application. As shown in FIGS. 22, 23 and 24, the tubular material prepared in the fifth example of the present application has some pro-endothelializing effect as an artificial vessel compared with glass, and there is a significant difference.

Example 6

Polycaprolactone (a molecular weight of 80000, purchased from Source Leaf Biology) is dissolved with acetone at a concentration of 50 mg/ml and mixed with the polyurethane solution used in the first example at a ratio of 1:2 by volume, and after thorough mixing, 3 drops are added at a rate of 10 ml/min and at 5 cm from the water surface, and the film is formed and rolled within 1 min using a PTFE bolt with a diameter of M3 (i.e., 3 mm) and a pitch of 0.5 mm, and each rolling is moved for 3.5 cm rightward relative to the edge of the tubular material of last time, the rolling of fourth time is moved for 3.5 cm leftward relative to the edge of the rolling of third time, that is, to be the same position as the rolling of second time, and according to this rule, the sixth, eighth, tenth . . . are all in the same position as that of the second time, and are then vacuum dried and taken off by rotation so as to obtain a tubular material with a helix interior.

Figure 25:
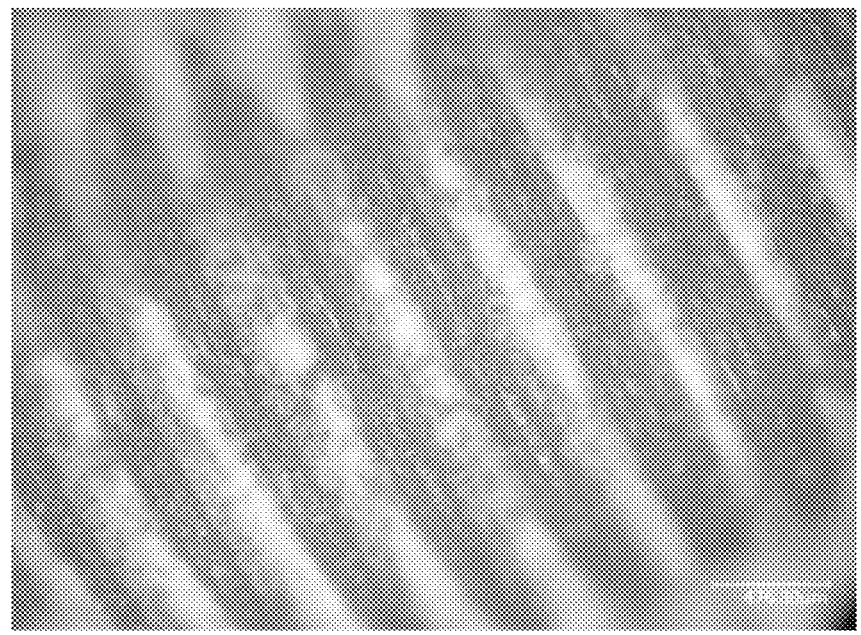
FIG. 25 is an optical magnification photograph of the tubular material prepared according to the sixth example.

The inner surface of the tubular material is characterized and the results are shown in FIG. 25, which is an optical magnification photograph of the tubular material prepared according to the sixth example. It can be seen from FIG. 25 that the tubular material prepared by the method according to the present application had a helix inner surface.

Figure 26:
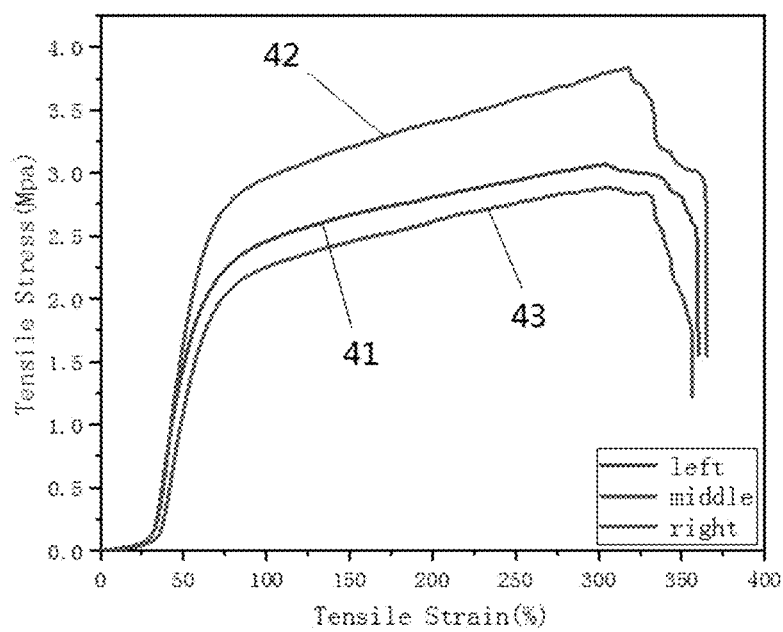
FIG. 26 is a stress-strain curve of the tubular material prepared according to the sixth example.

The tubular material is intercepted in 3 sections along the axial direction and marked as Left, Middle and Right, respectively, and the mechanical properties of the tubular material are tested, and the results are shown in FIG. 26. FIG. 26 is a stress-strain curve of the tubular material prepared according to the sixth example, and curves 41, 42 and 43 are the stress-strain curves of the Left, Middle and Right sections, respectively. As can be seen from FIG. 26, the tubular material prepared by the preparation method according to the present application had good tensile properties and the mechanical properties are more uniform.

Example 7

The polyurethane solution and polycaprolactone solution in the first example and the fifth example are prepared, respectively, and firstly the method is operated in accordance with the first example until the wall thickness of the tubular material is 60 μm, then the same method is used to increase the wall thickness of the tubular material to 100 μm within 10 s after each film formation using PCL solution, and finally the method is operated in accordance with the first example to make the wall thickness of the tubular material reach 140 μm, and the mold is directly pulled out and the tubular material is obtained by trimming.

Figure 27:
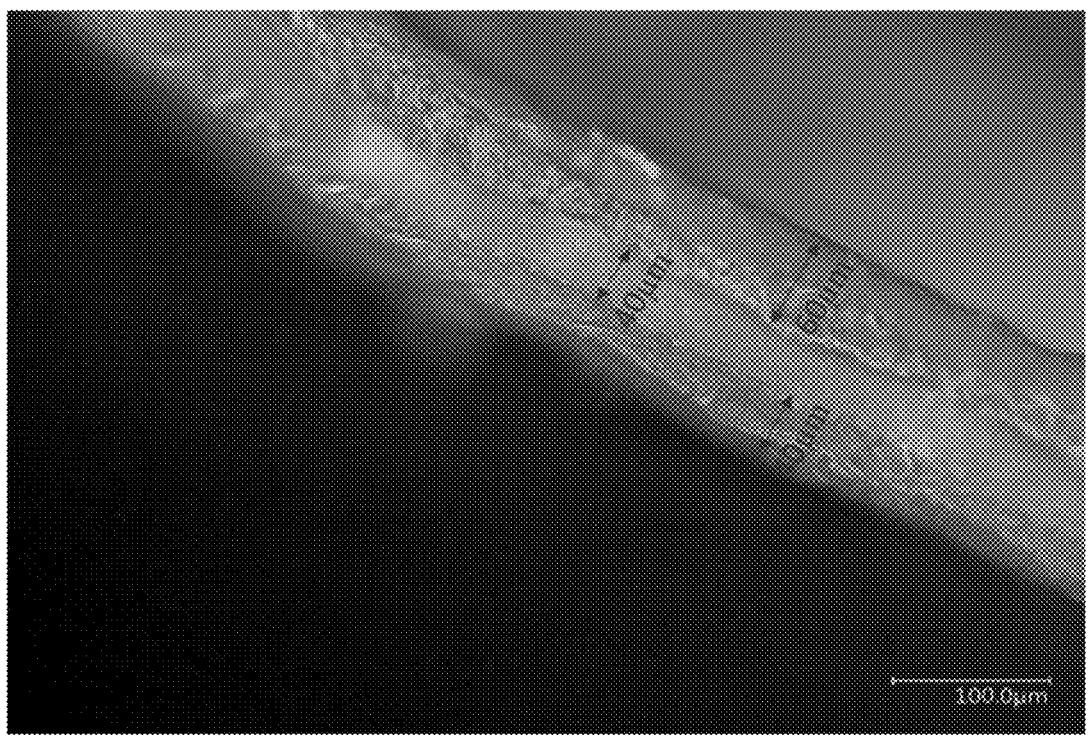
FIG. 27 is an optically magnified photograph of the tubular material prepared according to the seventh example of the present application.

The cross-section of the wall of the tubular material is characterized and the results are shown in FIG. 27. FIG. 27 is an optically magnified photograph of the tubular material prepared according to the seventh example of the present application. From FIG. 27, it can be seen that the wall thickness of the tubular material prepared by the method according to the present application is more uniform.

The content of the present application only exemplifies some of the specific examples claimed to be protected, where the technical features described in one or more of the technical solutions can be combined with any one or more of the technical solutions, and these combined technical solutions are also within the scope of protection of the present application, as if these combined technical solutions had been specifically described in the disclosure of the present application.

The invention claimed is:

1. A method for preparing a tubular material, comprising following steps:
   a) adding a polymer solution to a poor solvent to diffuse the polymer into a film on a liquid surface of the poor solvent to obtain a polymer film, wherein the polymer is dissolved in a good solvent to form the polymer solution, and the good solvent in the polymer solution is dissolved in the poor solvent;
   b) rolling, when the good solvent remains in a side of the polymer film not in contact with the poor solvent, the polymer film on the liquid surface of the poor solvent using a mold to obtain a bar material; and
   c) removing the mold to obtain the tubular material.

2. The preparation method according to claim 1, before step c), further comprising:
   repeating step a) and step b) to obtain a bar material including multilayered polymer films.

3. The preparation method according to claim 2, wherein the multilayered polymer films are the same or different in the bar material including multilayered polymer films.

4. The preparation method according to claim 3, wherein the step b) is repeated for n times, during the step b) is being repeated until the n/2th or (n+1)/2th or (n−1)/2th time, a rolling position is moved for a first distance in a first direction relative to a rolling position of previous time, and during the rest repetitions are being performed until the nth time, the rolling position is moved for the first distance in a second direction relative to a rolling position of previous time, the first direction is opposite to the second direction, and the first distance is 1 cm to 5 cm.

5. The preparation method according to claim 1, between step a) and step b), further comprising: performing surface treatment to the polymer film.

6. The preparation method according to claim 5, wherein the surface treatment comprises: laser etching of the polymer film.

7. The preparation method according to claim 1, wherein a surface of the mold has a microstructure.

8. The preparation method according to claim 1, wherein the polymer comprises one or more of polyurethane, polycaprolactone, polylactic acid, poly (styrene-ethylene-butylene-styrene) or polyethylene terephthalate;
   the solvent in the polymer solution comprises one or more of N,N-dimethylformamide, tetrahydrofuran, hexafluoroisopropanol, dioxane or dimethyl sulfoxide; and
   the poor solvent is water.

9. The preparation method according to claim 1, wherein the polymer solution further comprises an active substance.

10. The preparation method according to claim 1, further comprising:
    using the tubular material to prepare an artificial tubular tissue.

11. The preparation method according to claim 10, wherein the artificial tubular tissue comprises an artificial blood vessel, an artificial nerve conduit or an artificial heart stent.

12. The preparation method according to claim 1, further comprising:
    modifying the tubular material to obtain an artificial tubular tissue.

13. The preparation method according to claim 10, wherein the tubular material does not contain a binder.

* * * * *